United States Patent
Lee et al.

(10) Patent No.: US 9,013,166 B2
(45) Date of Patent: Apr. 21, 2015

(54) DC-DC CONVERTER CONTROLLER

(71) Applicant: Green Solution Technology Co., Ltd., New Taipei (TW)

(72) Inventors: Li-Min Lee, New Taipei (TW); Chao Shao, Wuxi (CN); Quan Gan, New Taipei (TW)

(73) Assignee: Green Solution Technology Co., Ltd., New Taipei (TW)

( * ) Notice: Subject to any disclaimer, the term of this patent is extended or adjusted under 35 U.S.C. 154(b) by 122 days.

(21) Appl. No.: 13/964,124

(22) Filed: Aug. 12, 2013

(65) Prior Publication Data

US 2014/0327423 A1    Nov. 6, 2014

(30) Foreign Application Priority Data

May 2, 2013    (CN) .......................... 2013 1 0158519

(51) Int. Cl.
*H02M 3/156* (2006.01)
*H02M 1/00* (2006.01)

(52) U.S. Cl.
CPC ...... *H02M 3/156* (2013.01); *H02M 2001/0025* (2013.01)

(58) Field of Classification Search
CPC .................. H02M 2001/0025; H02M 3/156; H02M 3/1563
USPC .......................... 323/282, 284, 285, 288, 351
See application file for complete search history.

(56) References Cited

U.S. PATENT DOCUMENTS

| | | | |
|---|---|---|---|
| 6,348,781 B1 | 2/2002 | Midya et al. | |
| 6,369,555 B2 | 4/2002 | Rincon-Mora | |
| 8,040,121 B2 | 10/2011 | Ishida et al. | |
| 8,395,367 B2 * | 3/2013 | Chien et al. | 323/288 |
| 8,698,467 B2 * | 4/2014 | Oki | 323/282 |

* cited by examiner

*Primary Examiner* — Gary L Laxton
(74) *Attorney, Agent, or Firm* — Jianq Chyun IP Office

(57) ABSTRACT

In a DC-DC converter controller of the present invention, a ramp voltage for compensating a reference voltage is designed to have the same valley value or peak value irrespective of an input voltage and an output voltage of a controlled converting circuit when the controlled converting circuit operates in the steady state. Hence, the DC-DC converter controller of the present invention is capable of controlling the controlled converting circuit to accurately output the output voltage in different applications.

13 Claims, 6 Drawing Sheets

DC-DC CONVERTER CONTROLLER

CROSS-REFERENCE TO RELATED APPLICATION

This application claims the priority benefit of China application serial no. 201310158519.8, filed on May 2, 2013. The entirety of the above-mentioned patent application is hereby incorporated by reference herein and made a part of this specification.

BACKGROUND OF THE INVENTION

1. Field of the Invention

The present invention relates to a DC-DC converter controller, and more particularly relates to a DC-DC converter with constant on-time control.

2. Description of the Prior Art

FIG. 1 is a schematic diagram of a DC-DC converting circuit with low voltage ripple and high frequency hysteretic disclosed in U.S. Pat. No. 6,369,555. The DC-DC converting circuit comprises a buffer circuit 2, a hysteresis comparator 4, a feedback circuit 6 and a driver circuit 8. The feedback circuit 6 is coupled to an output end of the hysteresis comparator 4 and provides a ramp voltage VRAMP to an input end of the buffer circuit 2. The input end of the buffer circuit 2 receives a superimposed signal VREF' of the ramp voltage VRAMP and a reference voltage VREF (i.e., VREF'=VREF+VRAMP). A non-inverting input end of the hysteresis comparator 4 is coupled to an output end of the buffer circuit 2 and an inverting input end thereof is coupled to an output voltage VOUT, and the output end thereof is coupled to the driver circuit 8. The driver circuit 8 may be a power transistor which is coupled to an input voltage VIN and an LC filter 12. The LC filter 12 supplies the output voltage VOUT.

The amplitude of the ramp voltage VRAMP is related to the amount of the input voltage VIN and the amount of the output voltage VOUT. FIG. 2 is waveforms of the superimposed signals shown in FIG. 1 in the different applications of the input voltage and the output voltage. A signal CLK_ON represents the duty cycle of the driver circuit 8. Both the direct current components of superimposed signals VREF'1 and VREF'2 are the reference voltage VREF, and a valley values and a peak values are determined by the input voltage VIN and the output voltage VOUT. Thus, the different applications cause the different peak values and valley values of the superimposed signals VREF'1 and VREF'2. The hysteresis comparator 4 executes judgment according to the peak value and the valley value of the superimposed signal VREF'. Such circuit characteristics will cause the hysteresis comparator 4 having the different offset voltages in the different applications, as shown in FIG. 2. The amounts of offset voltages Voffset1 and Voffset2 of the superimposed signals VREF'1 and VREF'2 are different to cause feedback signals FB1 and FB2 indicative of the output voltage VOUT being also different. Therefore, such circuit structures make the amount of the output voltage VOUT be different in different applications.

SUMMARY OF THE INVENTION

The conventional circuit structure has the inconsistent problem of output voltage in the different applications. The present invention makes the peak value or the valley value of the ramp voltage for compensation to be the same irrespective to the input voltage and the output voltage in a steady state. Thus, the present invention avoids the inconsistent problems of the output voltage above mentioned in the prior art.

To accomplish the aforementioned and other objects, an exemplary embodiment of the invention provides a DC-DC converter controller, adapted to control a converting circuit, which is coupled to an input voltage and an output end thereof provides an output voltage. The DC-DC converter controller comprises a ramp reference voltage generator, a comparator, a constant on-time controller and a driver circuit. The ramp reference voltage generator generates a ramp voltage according to a control signal, the input voltage and the output voltage, and superimposes the ramp voltage on a reference voltage for generating a ramp reference voltage. The comparator compares the ramp reference voltage with a feedback signal indicative of the output voltage and outputs a compared result signal for determining a start point in time per cycle. The constant on-time controller generates a pulse signal with constant pulse width according to the compared result signal per cycle for determining a conduction period. The driver circuit generates the control signal according to the pulse signal for controlling the converting circuit to transmit an electric power from the input voltage into the converting circuit. The ramp reference voltage generator comprises a ramp and predetermined cut off timing generator, a current generator, a buffer circuit and a reference voltage resistance. The ramp and predetermined cut off timing generator determines a predetermined cut off period after the conduction period per cycle according to the control signal, the input voltage and the output voltage. The current generator outputs a basic ramp current during the conduction period and the predetermined cut off period. The basic ramp current has the same amount at a start point in time of the conduction period and at an end point in time of the predetermined cut off period. The buffer circuit outputs the reference voltage. One end of the reference voltage resistance is coupled to the buffer circuit, and the other end thereof is coupled to the current generator and determines the ramp voltage according to the basic ramp current.

An embodiment of the present invention uses the comparator to replace the error amplifier of the prior art for having better transient response and lower voltage ripple.

It is to be understood that both the foregoing general description and the following detailed description are exemplary, and are intended to provide further explanation of the invention as claimed. In order to make the features and the advantages of the invention comprehensible, exemplary embodiments accompanied with figures are described in detail below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
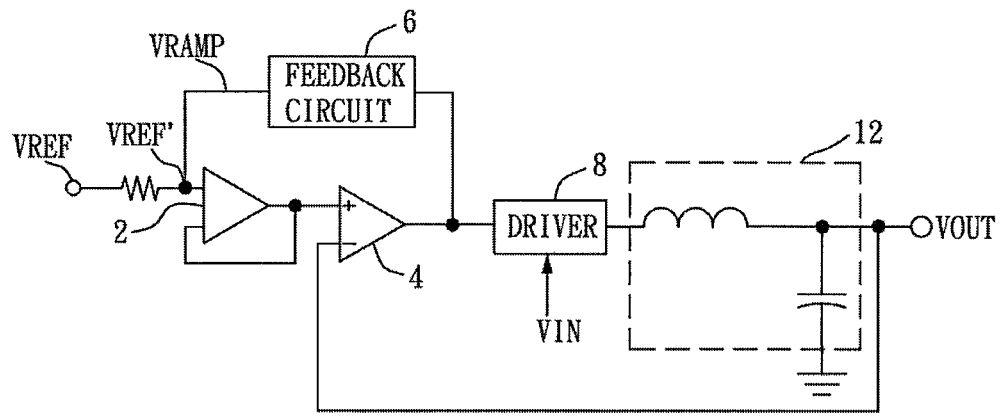
FIG. 1 is a schematic diagram of a DC-DC converting circuit with low voltage ripple and high frequency hysteretic disclosed in U.S. Pat. No. 6,369,555.
Figure 2:
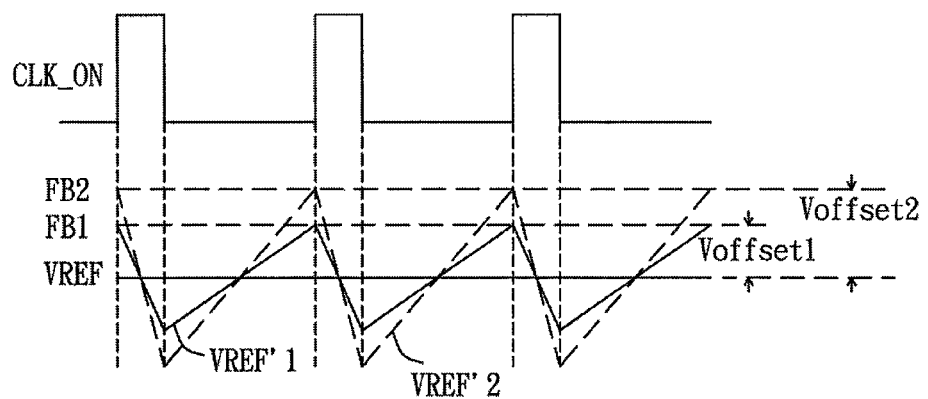
FIG. 2 is waveforms of the superimposed signals shown in FIG. 1 in the different applications of the input voltage and the output voltage.
Figure 3:
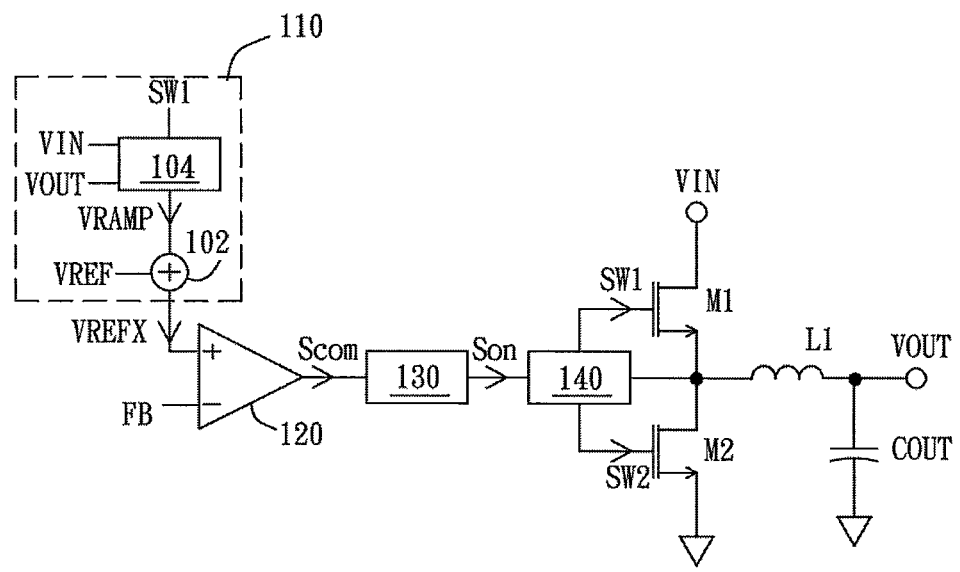
FIG. 3 is a schematic diagram of a DC-DC converter controller according to a preferred embodiment of the present invention.

FIG. 3 is a schematic diagram of a DC-DC converter controller according to a preferred embodiment of the present invention. The DC-DC converter controller comprises a ramp reference voltage generator 110, a comparator 120, a constant on-time controller 130 and a driver circuit 140, adapted to control a converting circuit. The converting circuit is a DC-DC buck converter in the present embodiment, comprising transistors M1 and M2, an inductance L1 and an output capacitor COUT. The DC-DC buck converter is coupled to an input voltage VIN and provides an output voltage VOUT at an output end thereof according to the control of the DC-DC converter controller. The ramp reference voltage generator 110 generates a ramp voltage VRAMP according to a control signal SW1, the input voltage VIN and the output voltage VOUT, and a ramp reference voltage VREFX is generated by superimposing the ramp voltage VRAMP on a reference voltage VREF. The comparator 120 compares the ramp reference voltage VREFX with a feedback signal FB indicative of the output voltage VOUT, and outputs a compared result signal Scom for determining a start point in time per cycle. The constant on-time controller 130 generates a pulse signal Son with constant pulse width according to the compared result signal Scom per cycle for determining a conduction period. The driver circuit 140 generates the control signal SW1 according to the pulse signal Son for controlling the converting circuit to transmit an electric power from the input voltage VIN into the converting circuit. The converting circuit is a synchronous rectification structure in the present embodiment. Hence, the driver circuit 140 may additionally generate a synchronous control signal SW2 to control the transistor M2 as the synchronous rectification switch. In practical application, the transistor M2 may be replaced with a rectifier diode, and so the driver circuit 140 only needs to generate the control signal SW1.

The ramp reference voltage generator 110 comprises a signal superimposed circuit 102, and a ramp and predetermined cut off timing generator 104. The ramp and predetermined cut off timing generator 104 receives the control signal SW1, the input voltage VIN and the output voltage VOUT. A start time of the control signal SW1 represents the beginning of a cycle as well as the beginning of the conduction period in the present cycle. The pulse width of the control signal SW1 represents the time period of the conduction period of the present cycle. The ramp reference voltage generator 110 calculates the time period of the predetermined cut off period according to the input voltage VIN and the output voltage VOUT when the converting circuit operates in a steady state, i.e., when a consumed power of a load coupled to the output end of the converting circuit is stable. At this moment, the relationship of the conduction period and the predetermined cut off period can be expressed as following:

the conduction period:the predetermined cut off period=VOUT:(VIN−VOUT)

Based on the above circuit design, the ramp voltage VRAMP generated by the ramp reference voltage generator 110 has an initial voltage at a start point in time of every cycle (i.e., the peak value or the valley value of the ramp voltage VRAMP) and changes in a first direction during the conduction period. Then, the ramp voltage VRAMP changes in a second direction during the predetermined cut off period after the conduction period. The ramp voltage VRAMP returns to the initial voltage at an end point in time of the predetermined cut off period. Wherein, the first direction and the second direction are opposite directions. Thus, one of the peak value and the valley value of the ramp voltage VRAMP is a fixed value when the ramp voltage VRAMP is in the steady state, irrespective to the input voltage VIN and the output voltage VOUT. The signal superimposed circuit 102 receives the reference voltage VREF and the ramp voltage VRAMP, and provides the ramp reference voltage VREFX by superimposing the two signals, so one of the peak value and the valley value of the ramp reference voltage VREFX is also a fixed value, irrespective to the input voltage VIN and the output voltage VOUT.

Which the peak value or the valley value of the ramp reference voltage VREFX is fixed depends on the practical applications. In the embodiment shown in FIG. 3, the ramp reference voltage VREFX is inputted at a non-inverting input end of the comparator 120, and the peak value of the ramp reference voltage VREFX is a fixed value. If the ramp reference voltage VREFX is inputted at an inverting input end of the comparator 120, the valley value of the ramp reference voltage VREFX is a fixed value.

Figure 4:
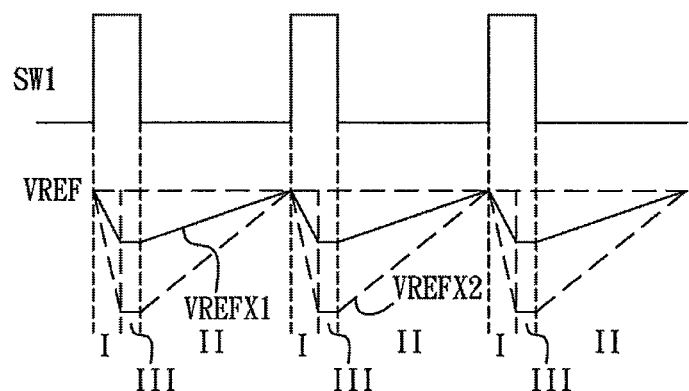
FIG. 4 is waveforms of the ramp reference voltages according to an embodiment shown in FIG. 3.

FIG. 4 is waveforms of the ramp reference voltages according to an embodiment shown in FIG. 3. The ramp reference voltages VREFX1 and VREFX2 have the different amplitude in the different applications, e.g., the amplitude of the ramp reference voltage are proportional to a voltage difference of the input voltage VIN and the output voltage VOUT. However, both the peak values of the ramp reference voltage VREFX1 and VREFX2 are equal to the reference voltage VREF. In the different applications, the valley values of the ramp reference voltage VREFX1 and VREFX2 may be set to be equal to the reference voltage VREF. The cycles shown in FIG. 4 can be distinguished in detail for a first time zone I, a second time zone II and a third time zone III. The first time zone I and the third time zone III are in the conduction period when the control signal SW1 is at a high level. The second time zone II is in the predetermined cut off period when the control signal SW1 is at a low level in the steady state. In the first time zone I, the ramp reference voltages VREFX1 and VREFX2 change in a decreasing direction of a first direction from the reference voltage VREF until that the ramp reference voltages VREFX1 and VREFX2 reach to predetermined voltage values, which may be different in the different applications. In the second time zone II, the ramp reference voltages VREFX1 and VREFX2 changes in an increase direction of a second direction from respective predetermined voltage values. Then, the ramp reference voltages VREFX1 and VREFX2 returns to the reference voltage VREF at an end point in time of the predetermined cut off period. In the third time zone III, the ramp reference voltages VREFX1 and VREFX2 maintain at respective predetermined voltage values. The time period of the first time zone I depends on the circuit design. It can be very short (while the time period of the third time zone III is almost equal to the conduction period.), or is equal to the conduction period (while the third time zone III does not exist).

Figure 5:
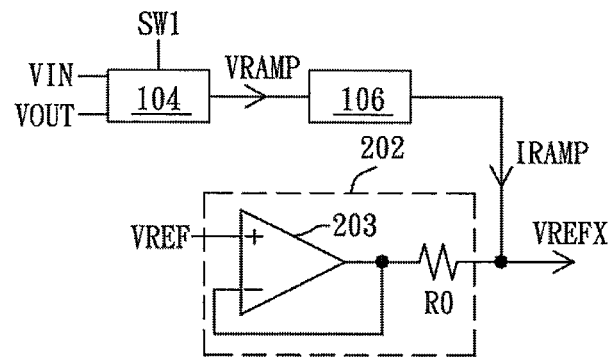
FIG. 5 is a schematic diagram of a ramp reference voltage generator according to a preferred embodiment of the present invention.

FIG. 5 is a schematic diagram of a ramp reference voltage generator according to a preferred embodiment of the present invention. The ramp reference voltage generator comprises a signal superimposed circuit 202, the ramp and predetermined cut off timing generator 104 and a current generator 106. The ramp and predetermined cut off timing generator 104 receives the control signal SW1, the input voltage VIN and the output voltage VOUT, and accordingly determines a predetermined cut off period after the conduction period per cycle and generates the ramp voltage VRAMP. Wherein, when the converting circuit operates in a steady state, the ramp voltage VRAMP has the same voltage value at a start point in time of the conduction period and an end point in time of the predetermined cut off period. The current generator 106 generates a ramp current IRAMP according to the ramp voltage VRAMP, and preferably the ramp current IRAMP is proportional to the ramp voltage VRAMP. The signal superimposed circuit 202 comprises a buffer circuit 203 and a reference voltage resistor R0. A non-inverting input end of the buffer circuit 203 receives the reference voltage VREF, an inverting input end thereof is coupled to an output end thereof, and so a potential of the output end is the same as the reference voltage VREF. The reference voltage resistor R0 is coupled between the output end of the buffer circuit 203 and the current generator 106, and so the ramp current IRAMP flows through the reference voltage resistor R0 to generate a voltage drop there across. Thus, the ramp reference voltage VREFX is the sum of the reference voltage VREF and the voltage drop across the reference voltage resistor R0, i.e., VREFX=VREF+IRAMP*R0.

Figure 6:
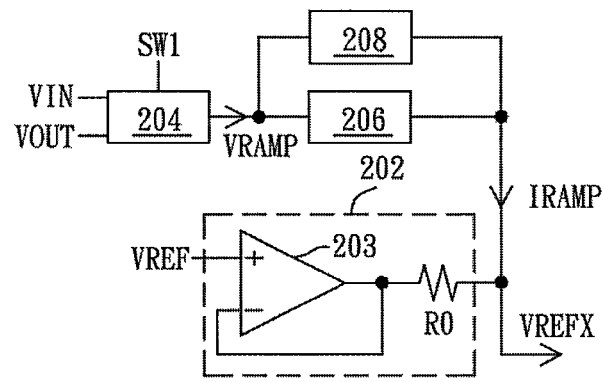
FIG. 6 is a schematic diagram of a ramp reference voltage generator according to another preferred embodiment of the present invention.

FIG. 6 is a schematic diagram of a ramp reference voltage generator according to another preferred embodiment of the present invention. The ramp reference voltage generator comprises the signal superimposed circuit 202, a ramp and predetermined cut off timing generator 204, a current generator 206 and a current regulator 208. The main differences of the ramp and predetermined cut off timing generator 104 shown in FIG. 5 and the ramp and predetermined cut off timing generator 204 of the present embodiment are the operation during the period from the end point in time of the predetermined cut off period to the start point in time of the next cycle. The ramp and predetermined cut off timing generator 104 shown in FIG. 5 maintains the ramp voltage VRAMP to be equal to the predetermined voltage value during this period, i.e., the ramp reference voltage VREFX is equal to the reference voltage VREF. The ramp voltage VRAMP of the ramp and predetermined cut off timing generator 204 still changes in the second direction during this period for enhancing transient response of the DC-DC converter controller.

The ramp and predetermined cut off timing generator 204 receives the control signal SW1, the input voltage VIN and the output voltage VOUT, and accordingly determines a predetermined cut off period after the conduction period per cycle and generates a ramp voltage VRAMP. As the ramp and predetermined cut off timing generator 104 shown in FIG. 5, the ramp voltage VRAMP generated by the ramp and predetermined cut off timing generator 204 has the same voltage value at a start point in time of the conduction period and an end point in time of the predetermined cut off period when the converting circuit operates in a steady state. If the load becomes lighter to make the feedback signal FB not returns to be equal to the reference voltage VREF at the end point in time of the predetermined cut off period, the ramp and predetermined cut off timing generator 204 will continue to change the ramp voltage VRAMP in the second direction for a predetermined extra time period or more. Compared with the circuit shown in the prior art, such the circuit design earlier enter into the next cycle and so has a better transient response. The current generator 206 and the current regulator 208 commonly generate the ramp current IRAMP according to the ramp voltage VRAMP. Preferably, the ramp current IRAMP is proportional to the ramp voltage VRAMP. Compared with the current generator 106 shown in FIG. 5, the current generator 206 stops providing the current during the period from the end point in time of the predetermined cut off period to the start point in time of the next cycle. During this period, only the current regulator 208 provides the ramp current IRAMP. The signal superimposed circuit 202 comprises the buffer circuit 203 and the reference voltage resistor R0. The non-inverting input end of the buffer circuit 203 receives the reference voltage VREF and the inverting input end thereof is coupled to the output end to make the potential of the output end be equal to the reference voltage VREF. The reference voltage resistor R0 is coupled to the output end of the buffer circuit 203, the current generator 206 and the current regulator 208 for generating a voltage drop there across while the ramp current IRAMP flows through the reference voltage resistor R0. Thus, the ramp reference voltage VREFX is the sum of the reference voltage VREF and the voltage across the reference voltage resistor R0, i.e., VREFX=VREF+IRAMP*R0.

Figure 7:
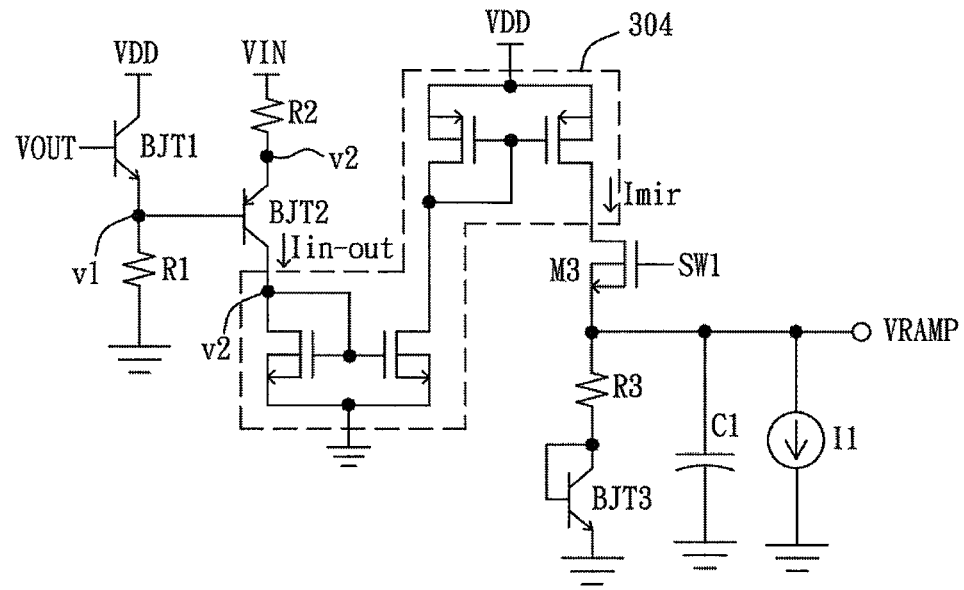
FIG. 7 is a schematic diagram of a ramp and predetermined cut off timing generator according to a preferred embodiment of the present invention.

FIG. 7 is a schematic diagram of a ramp and predetermined cut off timing generator according to a preferred embodiment of the present invention, which is applicable to the ramp reference voltage generator shown in FIG. 6. A first bipolar junction transistor BJT1 has a first collector, a first base and a first emitter. The first collector is coupled to a driver voltage VDD, the first base is coupled to the output voltage VOUT, and the first emitter is coupled to a common potential (i.e., the grounding) through a first resistor R1. Thus, a voltage v1 at a connect point of the first emitter of the first bipolar junction transistor BJT1 and the first resistor R1 is expressed as (VOUT−Vbe1), wherein Vbe1 is a forward bias voltage of the first bipolar junction transistor BJT1. A second bipolar junction transistor BJT2 has a second collector, a second base and a second emitter. The second emitter is coupled to the input voltage VIN through a second resistor R2, and the second base is coupled to the connect point of the first emitter of the first bipolar junction transistor BJT1 and the first resistor R1. A voltage v2 of a connect point of the second emitter of the second bipolar junction transistor BJT2 and the second resistor R2 is expressed as (v1+Vbe2)=(VOUT−Vbe1+Vbe2). If Vbe1=Vbe2, v2=VOUT, wherein Vbe2 is a forward bias voltage of the second bipolar junction transistor BJT2. Therefore, a current Iin-out outputted at the second collector of the second bipolar junction transistor BJT2 is substantially equal to the current flowing through the second resistor R2, (VIN−VOUT)/R2, i.e., it is proportional to a voltage difference of the input voltage VIN subtracting the output voltage VOUT.

A mirror circuit 304 mirrors the current Iin-out outputted at the second collector of the second bipolar junction transistor BJT2 to provide a mirror current Imir, proportional to that the input voltage VIN subtracting the output voltage VOUT, to a transistor M3. The transistor M3 is controlled by the control signal SW1. During the conduction period, the control signal SW1 is at the high level and so the transistor M3 is turned on. A third resistor R3 and a third bipolar junction transistor BJT3, connected in series, are connected to a capacitor C1 in parallel. A third base of the third bipolar junction transistor BJT3 is coupled to a collector thereof. During the conduction period, the mirror current Imir charges the capacitor C1 until that a voltage of a connect point of the third resistor R3 and the capacitor C1 reaches (R3*Imir+Vbe3), wherein Vbe3 is a forward bias voltage of the third bipolar junction transistor BJT3. The voltage of the connect point of the third resistance R3 and the capacitor C1 is the ramp voltage VRAMP. A discharged current source I1 is also coupled to the capacitor C1, for discharging the capacitor C1. Due to the mirror current Imir is significantly larger than the current of the discharged current source I1, and so the influence of the discharged current source I1 on the ramp voltage VRAMP can be omitted during the conduction period. Due to that the current Iin-out is proportional to the voltage difference of the input voltage Vin and the output voltage VOUT, the voltage variation (amplitude) is also proportional to the voltage difference of the input voltage Vin and the output voltage VOUT. After the conduction period is ended, the transistor M3 is turned off and so the ramp voltage VRAMP on the capacitor C1 start to be decreased due to the discharged current source I1. A predetermined cut off time Toff_c for the ramp voltage VRAMP decreased to a voltage Vbe3 can be expressed as the following:

$$Toff\_c=(R3*Imir+Vbe3-Vbe3)/I1=(R3*K*I in-out)/I1=R3*K*(VIN-VOUT)/(R2*I1)$$

Wherein, K is a constant.

Thus, when I1=(R3*K*VOUT)/(R2*Ton), Toff_c=Ton*(VIN−VOUT)/VOUT, wherein Ton is the time period of the conduction period, i.e., the conduction time of the transistor M1 when the converting circuit operates in the steady state. Moreover, the ramp reference voltage VREFX generated by the ramp reference voltage generator is proportional to the voltage difference of the input voltage VIN of the output voltage VOUT when the converting circuit operates in the steady state.

If the converting circuit operates in an unsteady state to cause the control signal SW1 being still in the low level after the predetermined cut off time passed, the discharging current source I1 will continuously discharge the capacitor C1 until that the voltage on the capacitor C1 is 0V. The time period for the voltage on the capacitor C1 being reduced from the forward bias voltage Vbe3 to 0V is a predetermined extra time period. Thereby, the DC-DC converting circuit of the present invention has the better transient response.

The third bipolar junction transistor BJT3 of the present embodiment can be replaced by another voltage source element, for example, the zener diode. The amount of the forward bias voltage Vbe3 of the third bipolar junction transistor BJT3 affects an offset of the valley value of the output voltage VOUT in the unsteady state and in the steady state. By modulating the offset, the present invention can modulate the transient response in the unsteady state. Furthermore, the offset is removed in the steady state. By modulating the amount of the forward bias voltage Vbe3, the present invention has the advantage for balancing the transient response against the amount of the offset.

The third bipolar junction transistor BJT3 of the present embodiment also can be omitted to meet the application of the ramp and the predetermined cut off timing generator 104 shown in FIG. 3 and FIG. 5. At this moment, it can ensure that the valley value of the output voltage does not generate the offset even in the unsteady state. Oppositely, the transient response is poor, compared with the circuit shown in FIG. 6.

Figure 8:
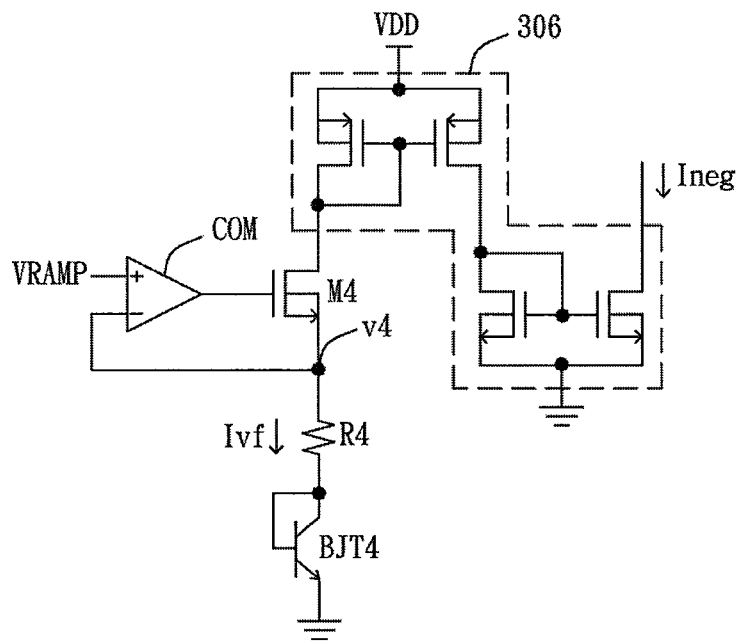
FIG. 8 is a schematic diagram of a current generator according to a preferred embodiment of the present invention.

FIG. 8 is a schematic diagram of a current generator according to a preferred embodiment of the present invention. The current generator is applicable to the ramp reference voltage generator shown in FIG. 6. A comparator COM and a transistor M4 compose a voltage follower. A fourth bipolar junction transistor BJT4 is connected to a fourth resistor R4 in series, a fourth base of the fourth bipolar junction transistor BJT4 is coupled to a fourth collector thereof, which is coupled to the transistor M4 through the fourth resistor R4, and a fourth emitter thereof is connected to the ground. The voltage follower receives the ramp voltage VRAMP generated by the ramp and predetermined cut off timing generator and so a voltage v4 of a connect point of the fourth resistor R4 and the transistor M4 is equal to the ramp voltage VRAMP. Thus, the voltage across the fourth resistor R4 is expressed as (VRAMP−Vbe4)=(R3*Imir+Vbe3−Vbe4), wherein Vbe4 is a forward bias voltage of the fourth bipolar junction transistor BJT4. If Vbe3=Vbe4, a current Ivf flowing through the fourth resistor R4 is expressed as (R3*Imir/R4). A mirror circuit 306 mirrors the current Ivf to output a basic ramp current Ineg. When the ramp voltage VRAMP is lower than the forward bias voltage Vbe3 and the control signal SW1 still is the low level in the unsteady state (i.e., the period from the end point in time of the predetermined cut off period to the start point in time of the next cycle), the mirror circuit 306 is cut off and cannot generate the basic ramp current Ineg. Therefore, the basic ramp current Ineg generated by the mirror circuit 306 of the present embodiment is a negative current, i.e., the basic ramp current Ineg flows into the mirror circuit 306 and the mirror circuit 306 stops generating the basic ramp current Ineg during the period mentioned above.

The fourth bipolar junction transistor BJT4 of the current generator of the present embodiment also can be omitted, such that the current generator of the present embodiment can applicably serve as the current generator 106 shown in FIG. 5.

Figure 9:
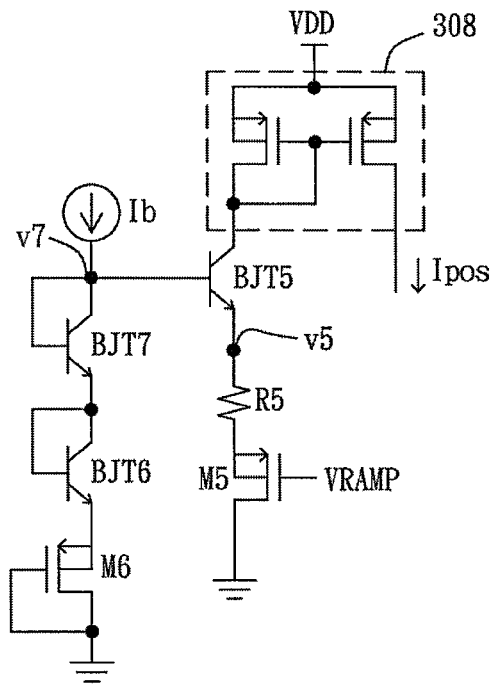
FIG. 9 is a schematic diagram of a current regulator according to a preferred embodiment of the present invention.

FIG. 9 is a schematic diagram of a current regulator according to a preferred embodiment of the present invention, which is applicable to the ramp reference voltage generator shown in FIG. 6. A sixth bipolar junction transistor BJT6, a seventh bipolar junction transistor BJT7 and a transistor M6 are connected in series and are driven by a bias current source Ib. A sixth base of the sixth bipolar junction transistor BJT6 is coupled to a sixth collector thereof. A seventh base of the seventh bipolar junction transistor BJT7 is coupled to a seventh collector thereof. A gate electrode of the transistor M6 is coupled to a drain electrode thereof. Hence, a voltage v7 of a connect point of the bias current source Ib and the seventh collector of the seventh bipolar junction transistor BJT7 is expressed as (Vbe7+Vbe6+Vgs6), wherein Vbe6 and Vbe7 are the forward bias voltages of the sixth bipolar junction transistor BJT6 and the seventh bipolar junction transistor BJT7 respectively, and Vgs6 is a threshold voltage of the transistor M6. A fifth base of a fifth bipolar junction transistor BJT5 is coupled to the seventh collector of the seventh bipolar junction transistor BJT7, and a fifth collector thereof is coupled to a mirror circuit 308, and a fifth emitter thereof is coupled to a transistor M5 through a fifth resistor R5. A gate electrode of the transistor M5 receives the ramp voltage VRAMP. The mirror circuit 308 mirrors the current flowing through the fifth resistor R5 to output an extra current Ipos.

When the forward bias voltages of the bipolar junction transistors are all the same, and a voltage v5 of a connect point of the fifth bipolar junction transistor BJT5 and the fifth resistor R5 can be expressed as following:

$$v5=Vgs6+Vbe6+Vbe7-Vbe5=Vgs6+Vbe$$

Therefore, when the ramp voltage VRAMP is higher than the forward bias voltage Vbe of the bipolar junction transistor, the voltage difference between a gate electrode and a source electrode of the transistor M5 is insufficient to conduct transistor M5. In other words, the current regulator stops generating the extra current Ipos during the conduction period and predetermined cut off period. When the ramp voltage VRAMP is equal to or lower than the forward bias voltage Vbe of the bipolar junction transistor, the voltage difference between the gate electrode and the source electrode of the transistor M5 is equal to or higher than the threshold voltage of the transistor M5 and so the transistor M5 is conducted. At this moment, the current regulator starts generating the extra current Ipos, and the amount of the extra current Ipos becomes larger with the reducing of the ramp voltage VRAMP. Namely, during a predetermined extra time period of the ramp voltage VRAMP reduced from Vbe to 0V, the extra current Ipos increases with time. The predetermined extra time period is determined according to the forward bias voltage Vbe of the bipolar junction transistor. The ramp voltage VRAMP maintains in 0V and the extra current Ipos becomes a fixed current after passing the predetermined extra time period.

The extra current Ipos generated by the mirror circuit 308 of the present embodiment is a positive current, i.e., the extra current Ipos flows out from the mirror circuit 308 only during the period from the end point in time of the predetermined cut off period to the start point in time of the next cycle. Hence, the extra current Ipos of the mirror circuit 308 and the basic ramp current Ineg of the mirror circuit 306 have opposite signs, and the operating timings of the mirror circuit 308 and the mirror circuit 306 are staggered with each other. Namely, in principle, the timings of currents generated by the current generator and the current regulator are staggered with each other.

Figure 10:
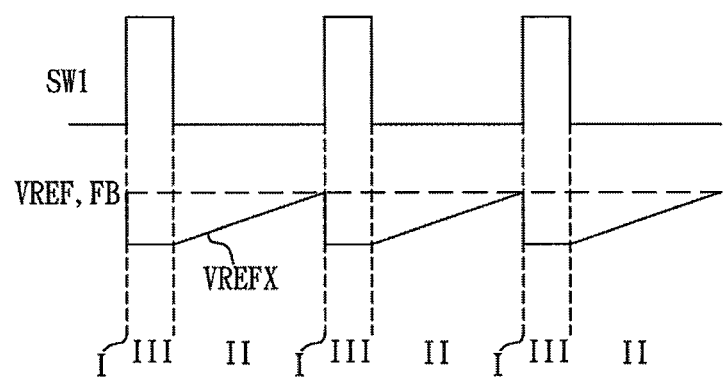
FIG. 10 is a waveform of the ramp reference voltage of a DC-DC converter controller operating in the steady state.

FIG. 10 is a waveform of the ramp reference voltage of a DC-DC converter controller operating in the steady state. Please referring to the ramp and predetermined cut off timing generator shown in FIG. 7, the mirror current Imir is significantly larger than the discharged current source I1, and so the time period of the first time zone I is extremely short. When the converting circuit operates in the steady state, the ramp reference voltage VREFX at both a start point in time of the cycle (the start point in time of the conduction period) and an end point in time of the cycle (the end point in time of the predetermined cut off period) has the same voltage equal to the reference voltage VREF, while the level of the feedback signal FB is also equal to the reference voltage VREF. The comparator 120 shown in FIG. 3 starts generating the compared result signal Scorn for starting a new cycle. Although the amplitudes in the different applications of the ramp reference voltage VREFX are different, all the levels of the feedback signal FB at the start points in time of new cycles are equal to the reference voltage VREF in the steady state. Therefore, the valley values of the output voltage VOUT are the same in different applications having different input voltages VIN and different output voltages VOUT.

Figure 11:
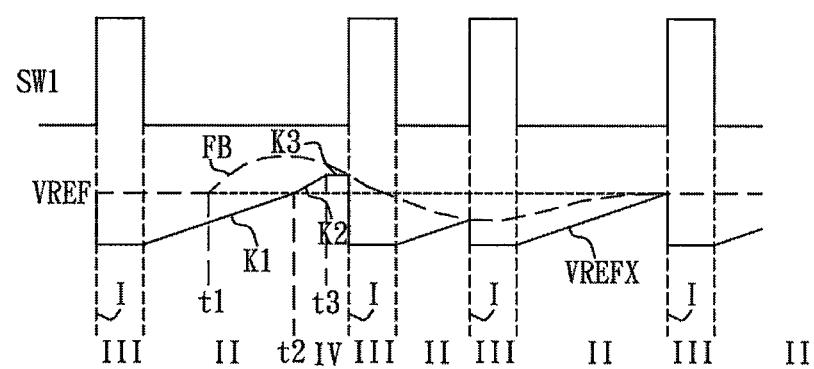
FIG. 11 is a waveform of the ramp reference voltage of a DC-DC converter controller operating in the unsteady state.

FIG. 11 is a waveform of the ramp reference voltage of a DC-DC converter controller operating in the unsteady state. At a time point t1, the load becomes lighter and so the levels of the output voltage VOUT and the feedback signal FB is increased. At a time point t2, the predetermined cut off period is passed and the ramp reference voltage VREFX returns to be equal to the reference voltage VREF, but still lower than the level of the feedback signal FB. In a fourth time zone IV, i.e., a period after the predetermined cut off period in the present cycle and prior to the start point of the next cycle. The ramp reference voltage VREFX still continues rising within a predetermined extra time period from the time point t2 to a time point t3, for expecting to earlier enter into the next cycle. If the converter controller cannot enter into the next cycle within the predetermined extra time period, the ramp reference voltage VREFX maintains the voltage value to avoid the output voltage VOUT being too high when entering into the next cycle. Hence, the DC-DC converting circuit of the present invention has a better accuracy of controlling the output voltage VOUT.

Moreover, the ramp reference voltage VREFX has a slope K1 (Voltage Variation Rate), determined based on the basic ramp current Ineg, during the predetermined cut off period and a slope K2, determined based on the extra current Ipos, during the predetermined extra time period. Preferably, the slope K2 (Voltage Variation Rate) is larger than the slope K1 for better transient response. Namely, a slope of the extra current Ipos (Current Variation Rate) during the predetermined extra time period is larger than a slope of the basic ramp current Ineg (Current Variation Rate) during the predetermined cut off period. A slope K3 (Voltage Variation Rate) of the ramp reference voltage VREFX may be zero after the predetermined extra time in the present cycle. Under such circuit design, the valley value of the output voltage VOUT is not continuously increased with time in a certain cycle which is extended to be too long due to a lighter load. Therefore, the differences of the valley value of the output voltage VOUT between a light load condition and a heavy load condition can be controlled with the reasonable range. Besides, the slope K2 of the extra current Ipos may be changed to be zero, i.e., the extra current Ipos is zero. Therefore, the valley values of the output voltage VOUT in the light load condition and the heavy load condition are substantially the same.

In the next cycle, the load becomes heavier and so the level of the feedback signal FB is reduced. The control signal SW1 is generated to enter into another next cycle before the ramp reference voltage VREFX is increased back to the reference voltage VREF.

Hence, the peak value or valley value of the ramp voltage in the DC-DC converter controller of the present invention is designed to be substantially constant irrespective to the input voltage and the output voltage when the controlled converting circuit operates in the steady state. Thus, the DC-DC converter controller of the present invention can accurately control the output voltage of the converting circuit in different applications.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

What is claimed is:

1. A DC-DC converter controller, adapted to control a converting circuit, which is coupled to an input voltage and provides an output voltage at an output end, the DC-DC converter controller comprising:
a ramp reference voltage generator, generating a ramp voltage according to a control signal, the input voltage and the output voltage, and superimposing the ramp voltage on a reference voltage for generating a ramp reference voltage;
a comparator, comparing the ramp reference voltage with a feedback signal indicative of the output voltage, and outputting a compared result signal for determining a start point in time per cycle;

a constant on-time controller, generating a pulse signal with a constant pulse width according to the compared result signal per cycle for determining a conduction period; and a driver circuit, generating the control signal for controlling the converting circuit according to the pulse signal to transmit an electric power from the input voltage into the converting circuit;

wherein the ramp reference voltage generator comprises:

a ramp and predetermined cut off timing generator, determining a predetermined cut off period after the conduction period per cycle according to the control signal, the input voltage and the output voltage;

a current generator, outputting a basic ramp current during the conduction period and the predetermined cut off period, and the basic ramp current has the same amount at a start point in time of the conduction period and at an end point in time of the predetermined cut off period thereof;

a buffer circuit, outputting the reference voltage; and a reference voltage resistor, which one end thereof is coupled to the buffer circuit, and the other end thereof is coupled to the current generator, so as to determine the ramp voltage according to the basic ramp current.

2. The DC-DC converter controller according to claim 1, wherein the ramp reference voltage generator further comprises a current regulator for outputting an extra current after the predetermined cut off period per cycle and before the conduction period of next cycle, and the reference voltage resistor determines the ramp voltage according to the extra current.

3. The DC-DC converter controller according to claim 2, wherein one of the peak value and the valley value of the ramp reference voltage is equal to the reference voltage when the converting circuit operates in a steady state.

4. The DC-DC converter controller according to claim 2, wherein the basic ramp current and the extra current have opposite signs.

5. The DC-DC converter controller according to claim 2, wherein when the converting circuit operates with a light load, the amount of the extra current is zero.

6. The DC-DC converter controller according to claim 2, wherein the amount of the extra current is increased with time within a predetermined extra time period, and is a fixed current after the predetermined extra time period.

7. The DC-DC converter controller according to claim 6, wherein a current variation rate of the extra current within the predetermined extra time period is larger than a current variation rate of the basic ramp current within the predetermined cut off period.

8. The DC-DC converter controller according to claim 6, wherein the predetermined extra time period is determined according to a forward bias voltage of a bipolar junction transistor.

9. The DC-DC converter controller according to claim 2, wherein an amplitude of the ramp reference voltage is proportional to a voltage difference of the input voltage and the output voltage when the converting circuit operates in a steady state.

10. The DC-DC converter controller according to claim 1, wherein one of the peak value and the valley value of the ramp reference voltage is equal to the reference voltage when the converting circuit operates in a steady state.

11. The DC-DC converter controller according to claim 1, wherein the ramp and predetermined cut off timing generator comprises:

a first bipolar junction transistor, having a first collector coupled to a driver voltage, a first base coupled to the output voltage and a first emitter coupled to a common potential through a first resistor; and a second bipolar junction transistor, having a second collector, a second base coupled to a connect point of the first emitter and the first resistor and a second emitter coupled to the input voltage through a second resistor, wherein the second collector outputs an outputted current proportional to a voltage difference of the input voltage subtracting the output voltage.

12. The DC-DC converter controller according to claim 11, wherein the ramp and predetermined cut off timing generator further comprises a third resistor, a third bipolar junction transistor and a capacitor, and the third resistor and the third bipolar junction transistor connected in series are connected to the capacitor in parallel, wherein a third collector of the third bipolar junction transistor is coupled to a third base thereof, and the third resistor is coupled to the second bipolar junction transistor.

13. The DC-DC converter controller according to claim 1, wherein an amplitude of the ramp reference voltage is proportional to a voltage difference of the input voltage and the output voltage when the converting circuit operates in a steady state.

* * * * *